United States Patent [19]
Ishikawa et al.

[11] Patent Number: 5,802,587
[45] Date of Patent: Sep. 1, 1998

[54] MEMORY CONTROLLER ADAPTED FOR RAPID BLOCK ACCESS OPERATIONS

[75] Inventors: Osamu Ishikawa; Toshikazu Ito, both of Tokyo, Japan

[73] Assignee: Oki Data Corporation, Tokyo, Japan

[21] Appl. No.: 636,571

[22] Filed: Apr. 23, 1996

[30] Foreign Application Priority Data

Apr. 25, 1995 [JP] Japan .................. 7-100937

[51] Int. Cl.$^6$ .................................. G06F 12/00
[52] U.S. Cl. ........................... 711/155; 711/154
[58] Field of Search ............... 711/155, 154, 711/171

[56] References Cited

U.S. PATENT DOCUMENTS

| | | | |
|---|---|---|---|
| 4,766,570 | 8/1988 | Yamaguchi et al. | 365/189.08 |
| 4,953,131 | 8/1990 | Purdham et al. | 365/222 |
| 5,179,555 | 1/1993 | Videlock et al. | 370/402 |
| 5,313,610 | 5/1994 | Oliver et al. | 395/842 |
| 5,544,180 | 8/1996 | Gupta | 371/47.1 |
| 5,585,863 | 12/1996 | Hackett et al. | 348/716 |
| 5,623,638 | 4/1997 | Andrade | 395/494 |
| 5,666,548 | 9/1997 | Grimm et al. | 395/800.01 |
| 5,668,967 | 9/1997 | Olson et al. | 395/842 |

*Primary Examiner*—Tod R. Swann
*Assistant Examiner*—Felix B. Lee
*Attorney, Agent, or Firm*—Rabin & Champagne, P.C.

[57] ABSTRACT

A memory controller has an address counter, a control circuit, and registers for receiving and storing a starting address, a block fetch size value, and write data. The address counter counts from the starting address, thereby generating successive addresses from which data in a memory device are read. When the amount of data designated by the block fetch size value has been read, the control circuit reloads the starting address into the address counter, the address counter generates the same successive addresses again, and the write data are written at these addresses. A block read-and-clear or block read-and-replace operation is thereby carried out. The memory controller may also have registers for storing the read data, and a logic operation circuit for combining the read and write data to carry out a block read-modify-write operation.

11 Claims, 11 Drawing Sheets

MEMORY CONTROLLER ADAPTED FOR RAPID BLOCK ACCESS OPERATIONS

BACKGROUND OF THE INVENTION

The present invention relates to a memory controller for performing read and write access to a block of data stored in a memory device.

The invented memory controller is useful when, for example, the memory device is used in the image buffer or frame buffer of a page printer, and the block of data represents a horizontal row of dots on a page, or part of a horizontal row of dots. The page is printed by reading such blocks of data into a shift register in the drive circuitry of, for example, an electrophotographic printing unit. After each block of data is read, it is often necessary to clear the block to all-zero data, or all-one data, in preparation for the next page. That is, a block read-and-clear operation must be carried out.

In some cases, instead of being cleared to all one's or all zero's, the block is replaced with arbitrary data, such as background pattern data for the next page. The operation to be performed is then a block read-and-replace. A block read-and-clear operation is a special case of a block read-and-replace operation, in which the replacement data have a fixed value throughout the block.

In creating the dot data for a page, the printer may also have to read a block of data, perform arithmetic or logic operations referred to as pixel operations on the read data and other data, then write the resulting modified data back to the same block. The operation performed in this case is a block read-modify-write operation.

The memory devices employed in many printers are dynamic random-access memory or DRAM devices, which receive multiplexed row and column address signals. To facilitate block access, many DRAM devices have a fast page mode in which a single row address signal can be followed by two or more column address signals. The memory access cycles performed in the fast page mode may be read cycles, write cycles, or read-write cycles. That is, input of each column address may be accompanied by a single read access, a single write access, or a read access followed by a write access at the same address.

A conventional DRAM controller of the type employed in page printers uses read-write cycles in fast page mode to perform the block read-and-clear, block read-and-replace, and block read-modify-write operations described above. Read accesses therefore alternate with write accesses in the following order: read access at a first address, write access at the first address, read access at a second address, write access at the second address, and so on.

The rate at which these block access operations can take place is limited by DRAM timing requirements. With the above access scheme, in each read-write cycle three types of timing requirements must be satisfied: timing requirements with respect to a column-address strobe signal; timing requirements with respect to a read control signal; and timing requirements with respect to a write control signal.

Many memory devices employ a single set of data terminals for both input and output, so that read and write accesses take place on the same data signal lines or data bus. In this case there is a further timing requirement: to prevent data collisions, between each read access and write access a certain interval must be provided in which the data bus is in the high-impedance state.

Specific timing requirements vary from one memory device to another, but it is generally true that when the same data terminals are used for both read and write access, the read-write cycle time in fast page mode is longer than the time required for two consecutive read accesses in fast page mode, or two consecutive write accesses in fast page mode. The methods adopted by conventional memory controllers for performing read-and-clear, read-and-replace, and read-modify-write operations are therefore inefficient in that they fail to make use of the maximum access speed of the memory device.

The same problem may occur when other types of memory, such as static random-access memory (SRAM), are accessed in this way.

SUMMARY OF THE INVENTION

It is accordingly an object of the present invention to perform block read-and-clear access efficiently.

Another object of the invention is to perform block read-and-replace access efficiently.

Yet another object of the invention is to perform block read-modify-write access efficiently.

The invented memory controller comprises a starting address register, a block fetch size register, at least one write data register, an address counter, and a control circuit. The memory controller is coupled between a higher-level controller and a memory device At the beginning of one of the above block access operations, the memory controller receives from the higher-level controller the starting address of the block to be accessed, and a value designating the size of the block. This address and value are stored in the starting address register and block fetch size register, respectively. The control circuit loads the starting address from the starting address register into the address counter, then sends control signals to the address counter and the memory device, causing the address counter to increment and the memory device to output read data from successive addresses designated by the address counter.

Either at or before the beginning of the block access operation, or while the read data are being output, the memory also receives write data from the higher-level controller, and stores the write data in the write data register or registers.

When the amount of read data output by the memory device has reached the amount designated by the value in the block fetch size register, the control circuit reloads the starting address from the starting address register into the address counter, sends control signals to the address counter and memory device, and sends the write data to the memory device, causing the address counter to increment again and the memory device to store the write data at the successive addresses again designated by the address counter. The block access operation ends when the amount of data thus written into the memory device reaches the amount designated by the value in the block fetch size register.

The same write data may be stored at all of the successive addresses designated by the address counter (read-and-clear) or, if the memory controller has a plurality of write data registers, different write data may be stored at different addresses (read-and-replace).

The memory controller may also have a plurality of read data registers for storing the data output from the memory device, and a logic operation circuit for performing logic operations on the data in a selected write data register and the data in a selected read data register, thereby generating modified data. In this case the modified data are sent to and stored in the memory device, in place of the write data.

When the memory device is a dynamic random-access memory, the address counter designates column addresses.

DETAILED DESCRIPTION OF THE INVENTION

Three embodiments of the invention will be described with reference to the attached illustrative drawings. In these drawings, the same symbols will be used to denote both signal names and the names of the signal lines carrying the signals. The suffix N will be used to denote control signals that employ negative logic and are hence active low. The suffix P will be used to denote data signals that employ positive logic.

The first embodiment is adapted for efficient performance of read-and-clear operations. The second embodiment is adapted for efficient performance of both read-and-clear and read-and-replace operations. The third embodiment is adapted for efficient performance of read-and-clear, read-and-replace, and read-modify-write operations.

Figure 1:
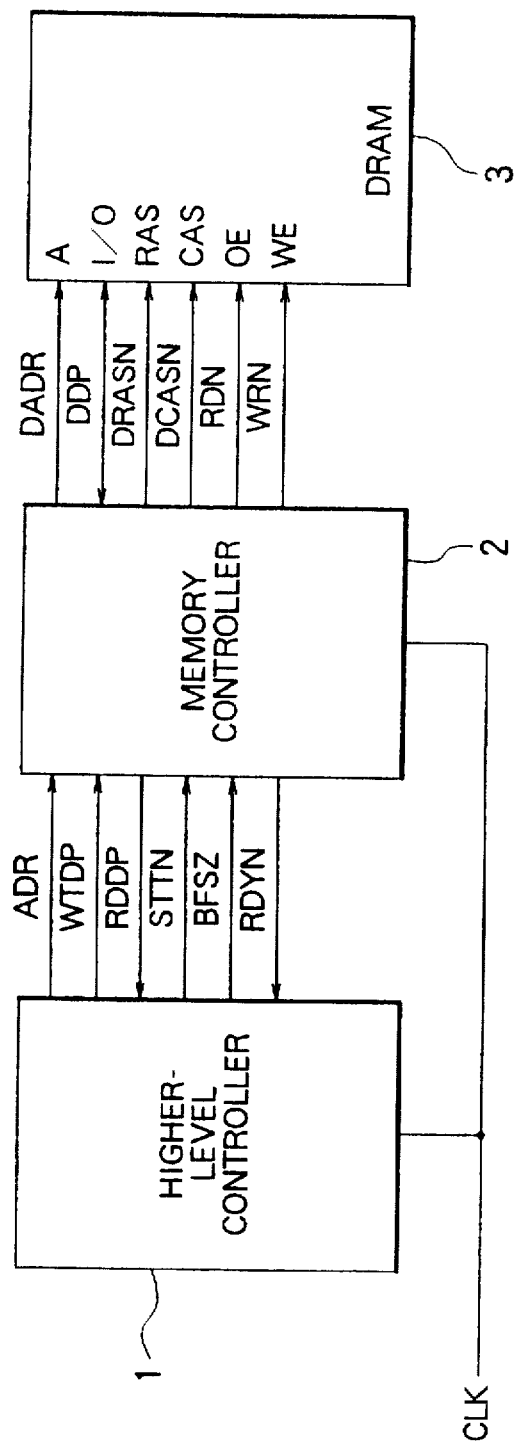
FIG. 1 illustrates the interconnections of a first embodiment of the invention to other circuits.

FIG. 1 shows an example of a device configuration in which the first embodiment is employed. In FIG. 1, a higher-level controller 1 such as a microprocessor communicates with the invented memory controller 2, which controls a dynamic random-access memory device 3. The higher-level controller 1 and memory controller 2 both operate in synchronization with a clock signal CLK. The other signals and signal lines in FIG. 1 are as follows.

ADR is an address signal sent from the higher-level controller 1 to the memory controller 2 designating the starting address of a block of data in the memory device 3 which is to be accessed.

WTDP is a write data bus, carrying data from the higher-level controller 1 to the memory controller 2 to be stored in the memory device 3.

RDDP is a read data bus, carrying data read from the memory device 3 from the memory controller 2 to the higher-level controller 1.

STTN is a start timing signal sent from the higher-level controller 1 to the memory controller 2.

BFSZ is a block fetch size signal sent from the higher-level controller 1 to the memory controller 2, designating the size of the block of data to be accessed.

RDYN is a ready signal sent from the memory controller 2 to the higher-level controller 1 to indicate timings at which the data on the RDDP signal line may be read.

DADR is an address signal sent from the memory controller 2 to the address input terminals (A) of the memory device 3.

DDP is a bi-directional data bus carrying data between the memory controller 2 and data input/output (I/O) terminals of the memory device 3.

DRASN is a row-address strobe signal sent from the memory controller 2 to the row-address strobe (RAS) input terminal of the memory device 3.

DCASN is a column-address strobe signal sent from the memory controller 2 to the column-address strobe (CAS) input terminal of the memory device 3.

RDN is a read signal sent from the memory controller 2 to the output enable (OE) terminal of the memory device 3.

WRN is a write signal sent from the memory controller 2 to the write enable (WE) terminal of the memory device 3.

Among these signals, STTN, RDYN, DRASN, DCASN, RDN, and WRN are single-bit signals. The other signals may be multiple-bit signals consisting of a number of bits sent in parallel. The data received by the memory device 3 at one time on data bus DDP, or output by the memory device 3 at one time on data bus DDP, will be referred to as a word. A word may be any unit of data, from a single bit on up. Data buses WTDP and RDDP have the same word width as data bus DDP.

Figure 2:
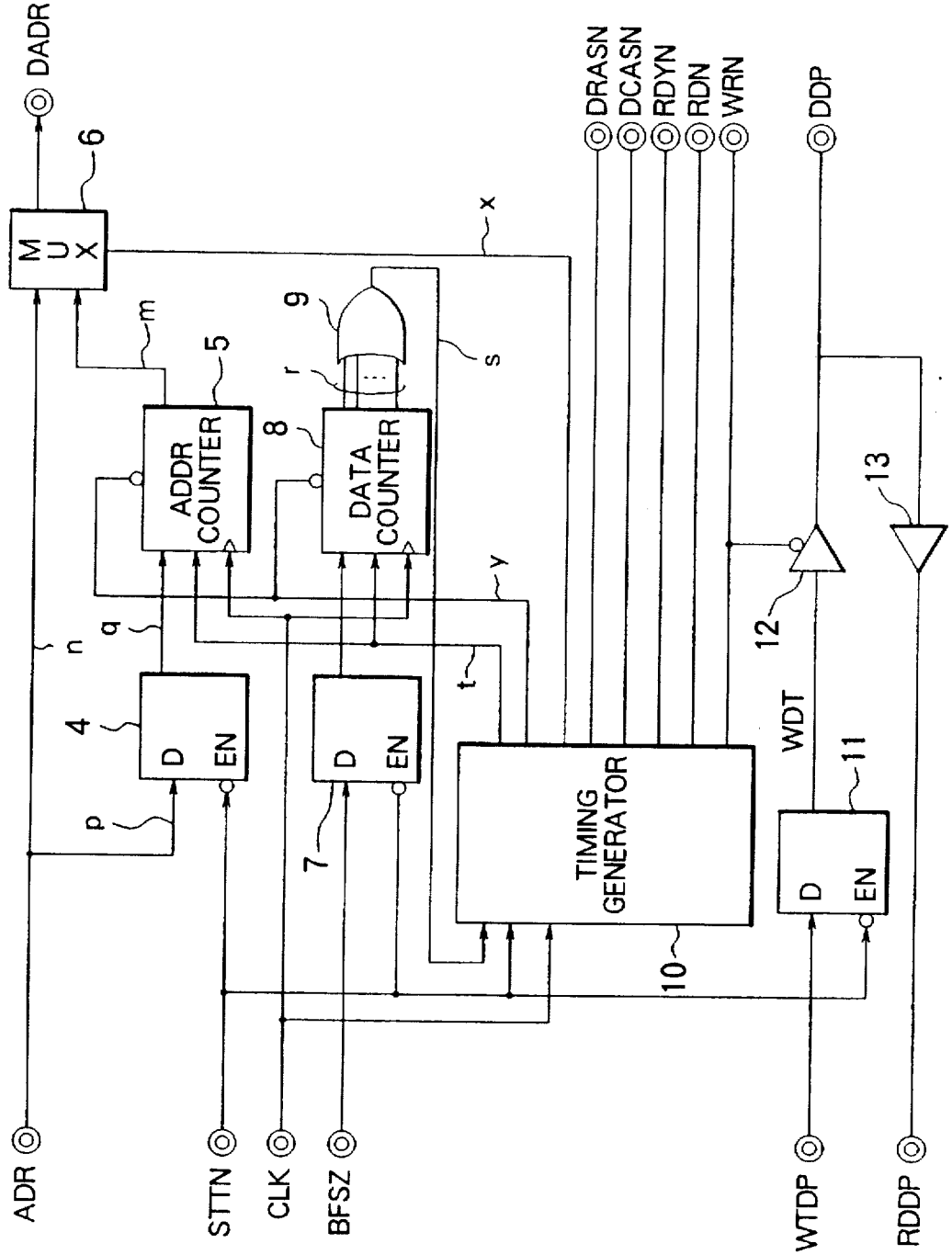
FIG. 2 is a block diagram of the first embodiment.

FIG. 2 shows the internal structure of the memory controller 2, using the signal names given in FIG. 1. The memory controller 2 comprises a starting address register 4, an address counter 5, a multiplexer 6, a block fetch size register 7, a data counter 8, an OR gate 9, a timing generator 10, a write data register 11, an output buffer 12, and an input buffer 13. The data counter 8, OR gate 9, timing generator 10, and output buffer 12 constitute a control circuit that controls the operation of the starting address register 4, and the sending of signals and data to the higher-level controller 1 and memory device 3.

Each of the registers 4, 7, and 11 comprises a parallel set of transparent latches, each latch having a data input terminal (D) and an enable input terminal (EN). While the enable input is low, the output from the latch is identical to the input at the data terminal. When the enable input goes high, the latch holds and outputs the last input data value. The latch continues to output this data value as long as the enable input remains high, regardless of any subsequent changes in the data input.

The number of latches in register 4 is equal to the number of column address bits. The number of latches in register 7 is equal to the bit width of the block fetch size (BFSZ) signal line. The number of latches in register 11 is equal to the bit width of the write data bus WTDP, i.e. the number of bits per word. For simplicity, the drawings show only one latch per register.

The address signal ADR received by the memory controller 2 consists of both row and column address bits, which are carried in parallel on separate bit signal lines. The row address signal lines are coupled to the multiplexer 6; the row address signal is denoted n. The column address signal lines are coupled to the starting address register 4; the column address signal is denoted p. The number of row address bits is normally equal to the number of column address bits, but this is not necessary.

The start timing signal STTN is supplied to the timing generator 10, and to the enable (EN) input terminals of registers 4, 7, and 11. Register 4 latches the column address signal p when STTN goes high, and outputs this column address signal p until STTN goes low again.

The clock signal CLK is supplied to the timing generator 10, and to clock input terminals of the counters 5 and 8.

BFSZ and WTDP are supplied as data inputs to registers 7 and 11, respectively. RDDP is output from the input buffer 13.

The column address value p held in the starting address register 4 is supplied as an initial count q to the address counter 5. The address counter 5 loads this initial count q in response to a counter load signal y from the timing generator 10. The address counter 5 also receives a counter enable signal t from the timing generator 10. While t is active (high), the address counter 5 increments once per clock (CLK) cycle. The count value in the address counter 5 is output as a column address signal m to the multiplexer 6.

The multiplexer 6 multiplexes the row and column address signals n and m in response to an address selection signal x from the timing generator 10. The row address n is output when x is high; the column address m when x is low. The multiplexer output is the address signal DADR supplied to the memory device 3.

The block fetch size value held in the block fetch size register 7 is supplied as an initial data count to the data counter 8. The data counter 8 loads this initial data count in response to the above-mentioned counter load signal y, and decrements once per clock (CLK) cycle while the above-mentioned counter enable signal t is high. The data count r in the data counter 8 is output to the OR gate 9. The OR gate 9 takes the logical OR of all bits of r, and supplies the resulting signal s to the timing generator 10. The result signal s is low when the count output by the data counter 8 is zero (when all bits of r are zero), and high in other cases.

In addition to generating signals t, x, and y, the timing generator 10 generates the signals DRASN, DCASN, RDYN, RDN, and WRN supplied to the higher-level controller 1 and memory device 3. These signals are output at certain timings in relation to the STTN and s inputs, in synchronization with the CLK input, as described later. WRN is also supplied to the output buffer 12.

The write data WDT latched in the write data register 11 are sent to the output buffer 12. When WRN is active (low), the output buffer 12 places these data WDT on data bus DDP for output to the memory device 3. When WRN is inactive (high), the output buffer 12 is in the high-impedance state.

The input buffer 13 receives whatever data are present on data bus DDP, and sends these same data to the higher-level controller 1 on data bus RDDP. Validity of the data on RDDP is indicated by low output on signal line RDYN. The higher-level controller 1 latches the data on RDDP at, for example, low-to-high transitions of RDYN.

Figure 3:
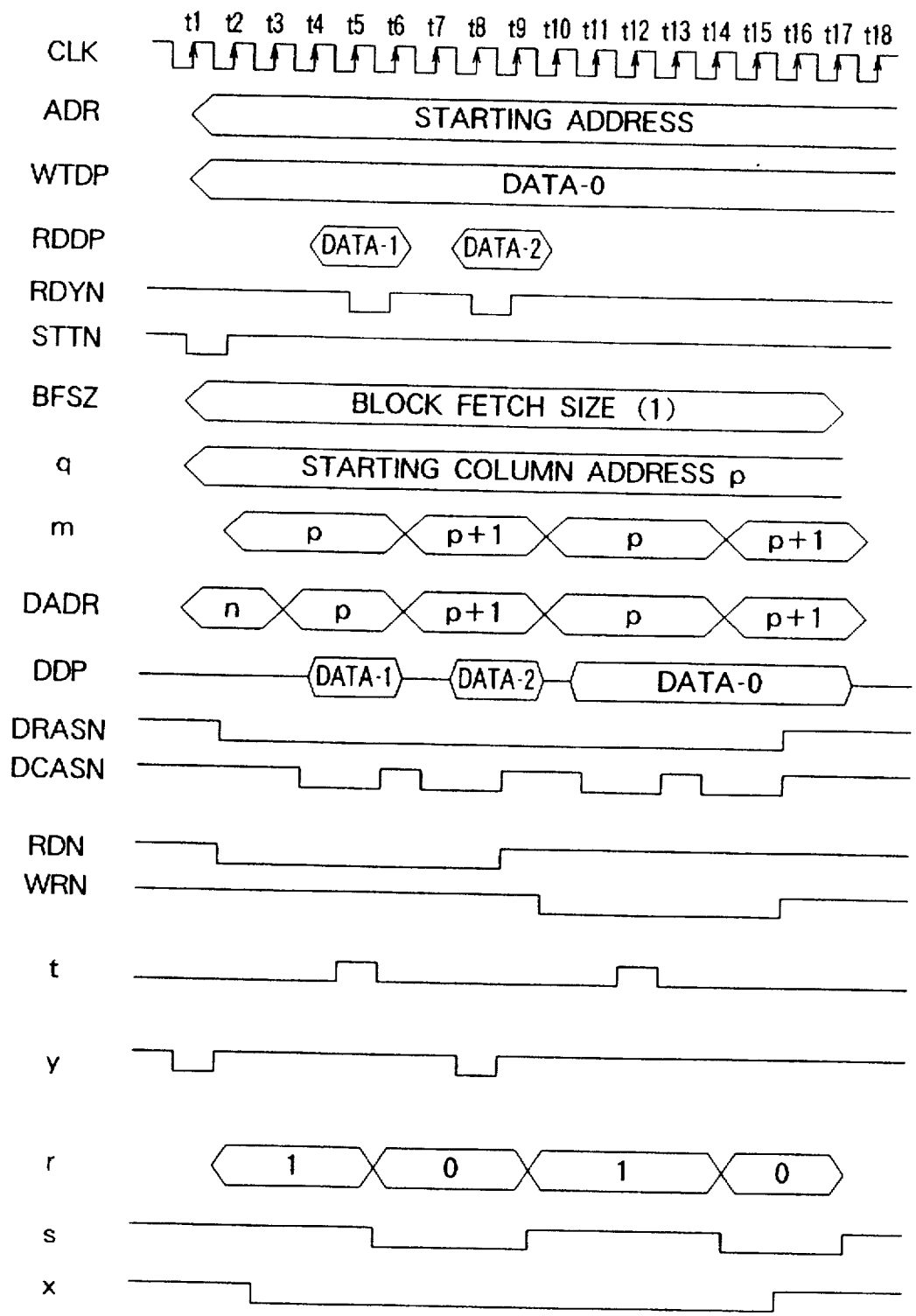
FIG. 3 is a timing diagram illustrating the operation of the first embodiment.

Next the operation of the invented memory controller 2 will be described with reference to FIG. 3. FIG. 3 illustrates the reading and clearing of a block of data consisting of just two words, but it will be clear that the same operation can be carried out on larger blocks.

Operation of the memory controller 2 is synchronized to low-to-high transitions of the clock signal CLK, shown at the top of FIG. 3. These transitions indicate timings t1, t2, . . . . Initially, before timing t1, the counter enable signal t is inactive (low), the counter load signal y is inactive (high), and the address selection signal x is high, causing the multiplexer 6 to select the row address signal n. The row and column address strobe signals DRASN and DCASN and the read and write signals RDN and WRN are initially inactive (high).

At timing t1, the higher-level controller 1 asserts the start timing signal STTN for one clock period, outputs an address signal ADR designating the starting address of the block to be accessed, outputs the block fetch size value on the BFSZ signal line, and outputs a write data value DATA-0 to which the block is to be cleared on the write data signal line WTDP. The timing generator 10 responds to the STTN input by driving the counter load signal y low.

The block consists of one or more words at successive column addresses, all words having the same row address. The block size in the present example (two words) is designated by a value of one on the BFSZ signal line. In general, the BFSZ value is one less than the block size.

To clear a block to all 0's, the write data should be zero. To clear a block to all 1's, the write data should be all 1's. When the word size is greater than one bit, the block can be cleared to values other than all 0's or all 1's. With four-bit words, for example, the block can be cleared to a pattern of alternating 0's and 1's by using '0101' or '1010' as the write data.

The address selection signal x remains high, so the row bits (n) of the starting address are output via multiplexer 6 on the DADR signal line to the memory device 3. The column address bits (p) are supplied through register 4 as the initial count q to the address counter 5. The block fetch size is supplied through register 7 as an initial count to the data counter 8. The write data DATA-0 are supplied through register 11 to the output buffer 12, but are not yet output, as the write signal WRN is inactive.

At timing t2, the higher-level controller 1 de-asserts STTN, leaving the column address p latched in register 4, the block fetch size (1) latched in register 7, and the write data DATA-0 latched in register 11. The timing generator 10 responds by driving the counter load signal y high, loading the starting column address p into the address counter 5 and the block fetch size designation (1) into the data counter 8. The timing generator 10 also asserts the row address strobe DRASN, causing the memory device 3 to latch the row address n on the address signal line DADR, and asserts the read signal RDN, enabling output from the memory device 3.

At timing t3, the timing generator 10 switches the address selection signal x from high to low, so that the multiplexer 6 outputs the column address signal m obtained from the address counter 5, the value of which is now the starting column address p. The starting column address p appears on the address signal line DADR.

At timing t4, the timing generator 10 asserts the column address strobe signal DCASN, causing the memory device 3 to latch the starting column address p. Since the inputs at the CAS and OE terminals of the memory device 3 are low and the input at the WE terminal is high, the memory device 3 outputs the data DATA-1 at the designated row address n and column address p on the data bus DDP. The memory controller 2 sends the same data DATA-1 to the higher-level controller 1 on the RDDP data bus.

At timing t5, the timing generator 10 asserts the ready signal RDYN and tests the result signal s. Since the result signal s is high, the timing generator 10 asserts the counter enable signal t for one clock period.

At timing t6, the timing generator 10 de-asserts the ready signal RDYN. The higher-level controller 1 latches the read data DATA-1 at the low-to-high transition of RDYN. The timing generator 10 also de-asserts the counter enable signal t. There is a slight delay, not visible in the drawing, between the low-to-high transition of the clock signal CLK at timing t6 and the high-to-low transition of the counter enable signal t. The low-to-high clock transition therefore occurs while t is high, causing address counter 5 to increment and data counter 8 to decrement. The new count values p+1 and zero appear on the m, DADR, and r signal lines with a short delay from timing t6. Since the count value r is now zero, the result signal s goes low. The timing generator 10 also de-asserts the column address strobe DCASN, causing output of DATA-1 from the memory device 3 to cease.

At timing t7, the timing generator 10 re-asserts the column address strobe DCASN, causing the memory device 3 to latch the next column address p+1 and begin output of the data DATA-2 stored at row address n and column address p+1.

At timing t8, the timing generator 10 asserts the ready signal RDYN and tests the result signal s. Since the result signal s is low and the write signal WRN is high, the timing generator 10 knows that the read phase of the read-and-clear operation has been completed, and drives the counter load signal y low for one clock period in preparation for the clear phase.

At timing t9, the timing generator 10 de-asserts the ready signal RDYN, causing the higher-level controller 1 to latch the read data DATA-2, and de-asserts the column address strobe DCASN and read signal RDN, causing output of DATA-2 from the memory device 3 on data bus DDP to cease. The timing generator 10 also drives the counter load signal y high, reloading the starting column address p into address counter 5 and the block fetch size value (1) into the data counter 8. The reloaded count values p and one appear on the m, DADR, and r signal lines shortly after timing t9.

At timing t10, the timing generator 10 asserts the write signal WRN, placing the memory device 3 in write mode, and causing the output buffer 12 to begin output of the write data DATA-0 held in register 11. The write data DATA-0 appear on data bus DDP shortly after timing t10.

At timing t11, the timing generator 10 asserts the column address strobe DCASN, causing the memory device 3 to store the write data DATA-0 on data bus DDP at the column address p indicated on the address bus DADR, in row n.

At timing t12, the timing generator 10 tests the result signal s. Since the result signal s is high, the timing generator 10 asserts the counter enable signal t for one clock period.

At timing t13, address counter 5 increments from p to p+1, and data counter 8 decrements from one to zero. The timing generator 10 de-asserts the column address strobe DCASN, and drives the counter enable signal t low.

At timing t14, the timing generator 10 asserts the column address strobe DCASN, causing the memory device 3 to store the data DATA-0 on data bus DDP at column address p+1 in row n.

At timing t15, the timing generator 10 tests the result signal s. Since the result signal s and write signal WRN are both low, the timing generator 10 knows that the block read-and-clear operation has been completed.

At timing t16, the timing generator 10 de-asserts the row and column address strobe signals DRASN and DCASN and the write signal WRN, and switches the address selection signal x back to high to select the row address signal. Since WRN is high, the output buffer 12 ceases output of the write data DATA-0 on data bus DDP.

At timing t17, the memory controller 2 is ready to begin the same sequence of operations as at timing t1, to read and clear another block of data.

The number of clock periods needed to read and clear a block of N words, where N is an arbitrary positive integer, can be calculated as follows. As the preceding description shows, each individual read or write operation takes up three clock periods. Three additional clock periods (t1–t3) are required for initialization and row address output, and one additional clock period (t10) for switching the memory from read mode to write mode, so a block of N words can be read and cleared in a total of 6N+4 clock periods.

Figure 4:
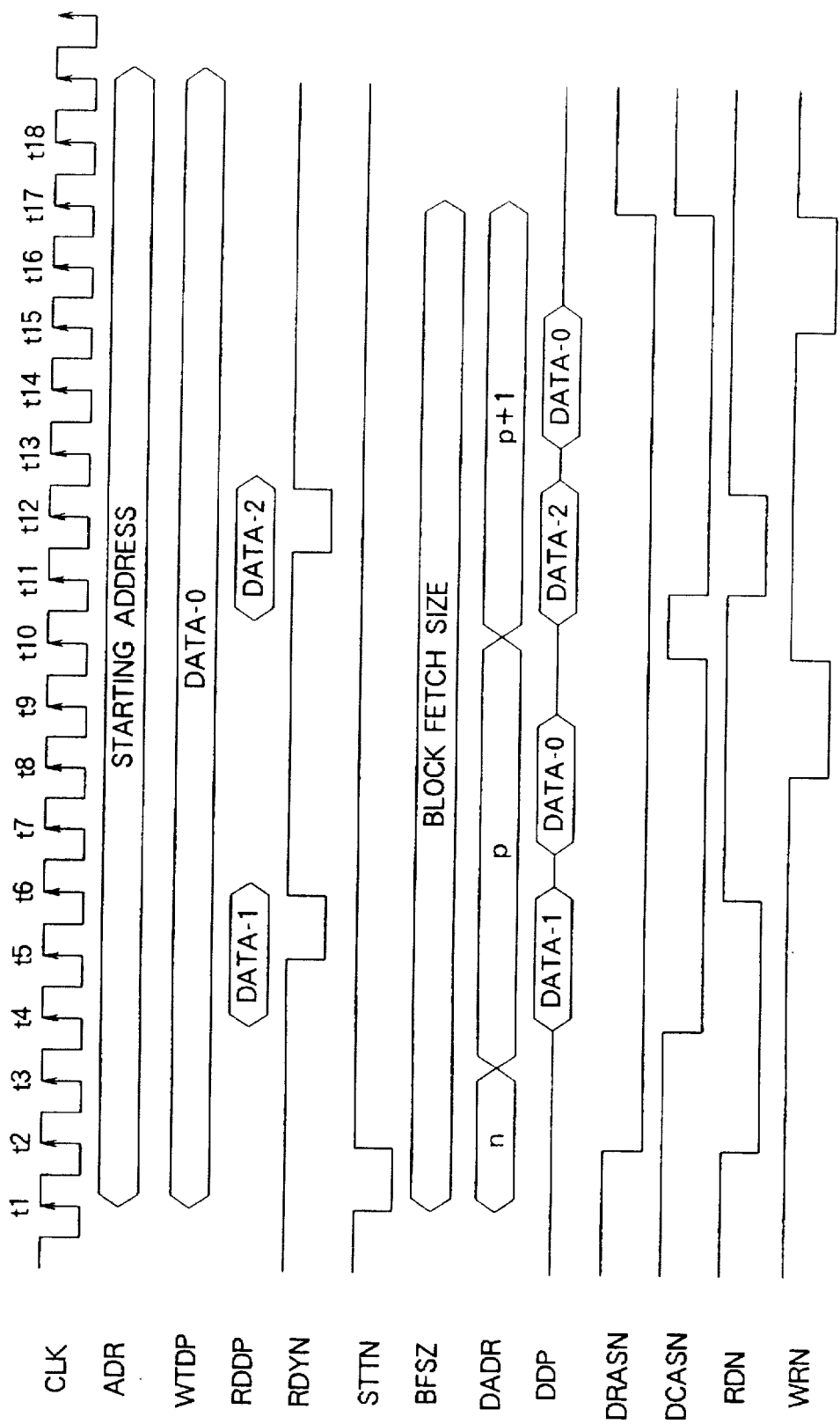
FIG. 4 is a timing diagram illustrating the operation of a conventional memory controller.

For comparison, FIG. 4 shows the same two-word read-and-clear operation as performed by a conventional memory controller, using fast page mode read-write access. The signal names are the same as in FIG. 3. The conventional memory controller uses three clock periods (t1–t3) for initialization and row address output, then three clock periods (t4–t6) for read access to column address p, four clock periods (t7–t10) for write access to column address p, three clock periods (t11–t13) for read access to column address p+1, and four clock periods (t14–t17) for write access to column address p+1. Each read-write cycle occupies seven clock periods, so the number of clock periods required for reading and clearing a block of N words is 7N+3. When N is greater than one, the first embodiment (6N+4) is faster.

Figure 5:
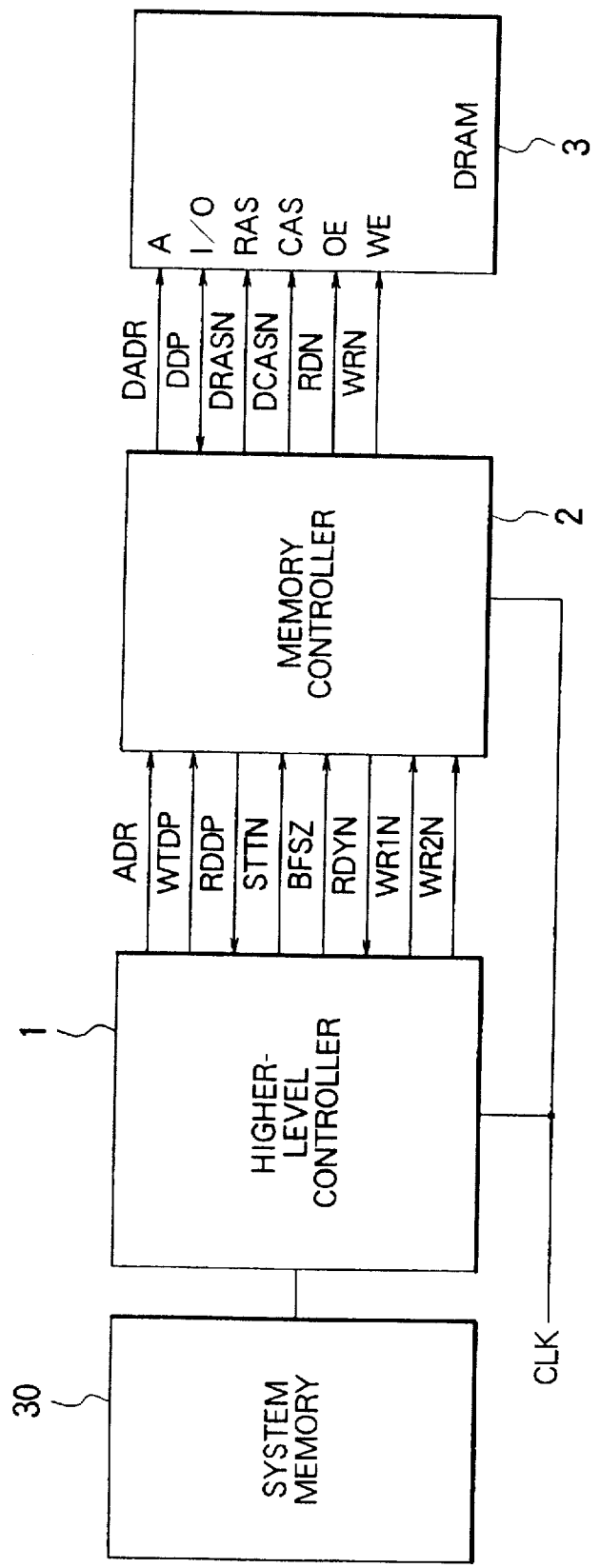
FIG. 5 illustrates the interconnections of a second embodiment of the invention to other circuits.

FIG. 5 illustrates the interconnections of the second embodiment of the invention, using the same reference numerals as in FIG. 1 for equivalent elements. The difference from the first embodiment is that the higher-level controller 1 supplies two write signals WR1N and WR2N to the memory controller 2. The higher-level controller 1 is also connected to a system memory 30, which stores data that will be used to replace the data read from the memory device 3.

Figure 6:
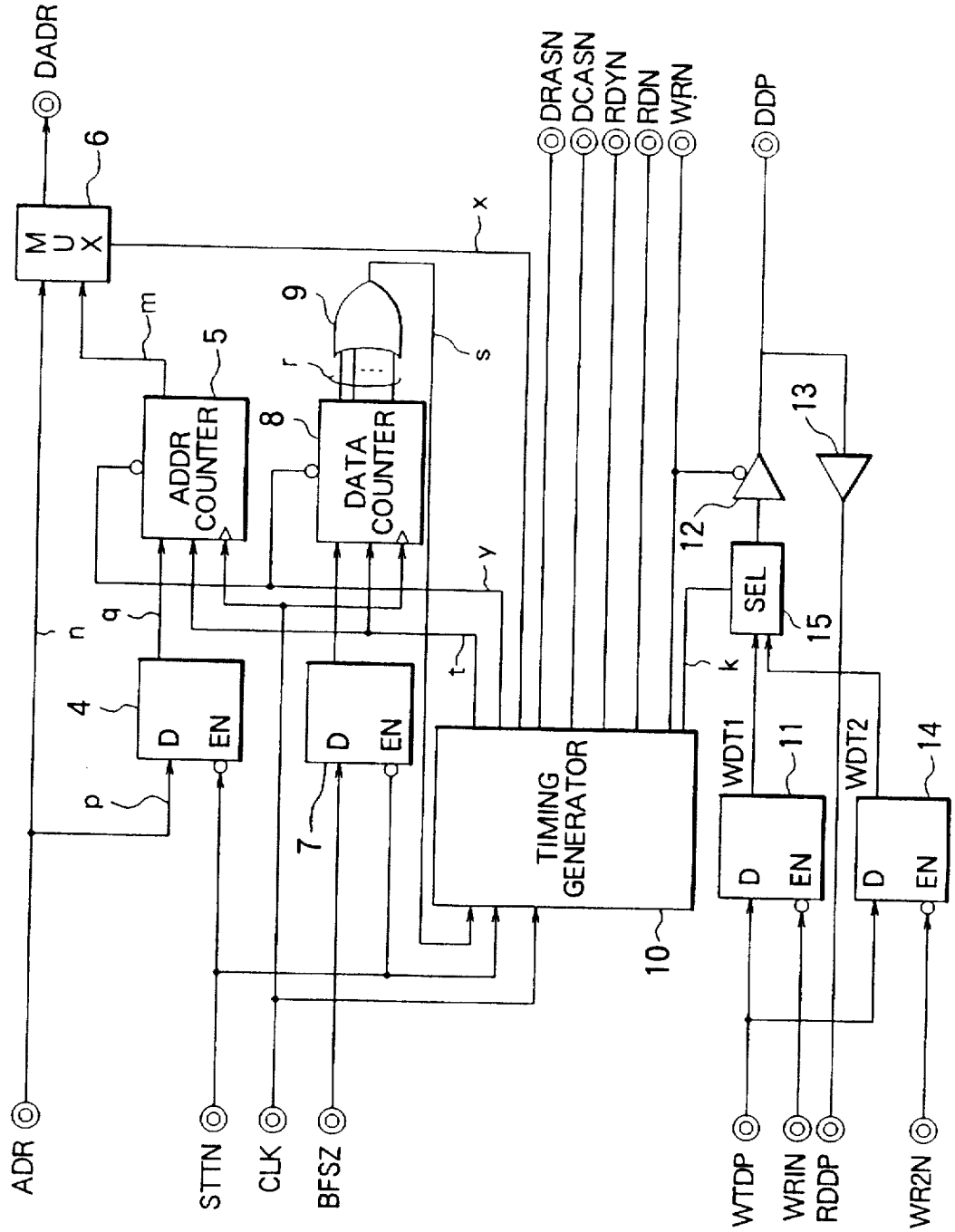
FIG. 6 is a block diagram of the second embodiment.

FIG. 6 shows the structure of the memory controller 2 in the second embodiment. Elements identical to elements in the first embodiment are identified by the same reference numerals as in FIG. 2. The new elements are a second write data register 14 and a selector 15.

As data input, register 14 receives the same write data signal WTDP as register 11. The enable inputs to registers 11 and 14 are not the start timing signal STTN, but the two write signals WR1N and WR2N from the higher-level controller 1. The outputs of registers 11 and 14 are denoted WDT1 and WDT2.

The selector 15 receives these two outputs WDT1 and WDT2 and a data selection signal k from the timing generator 10. When data selection signal k is low, selector 15 selects write data WDT1 from write data register 11 and supplies WDT1 to the output buffer 12. When data selection signal k is high, selector 15 selects write data WDT2 from write data register 14 and supplies WDT2 to the output buffer 12.

Descriptions of the other elements will be omitted, as they are the same as in the first embodiment.

Figure 7:
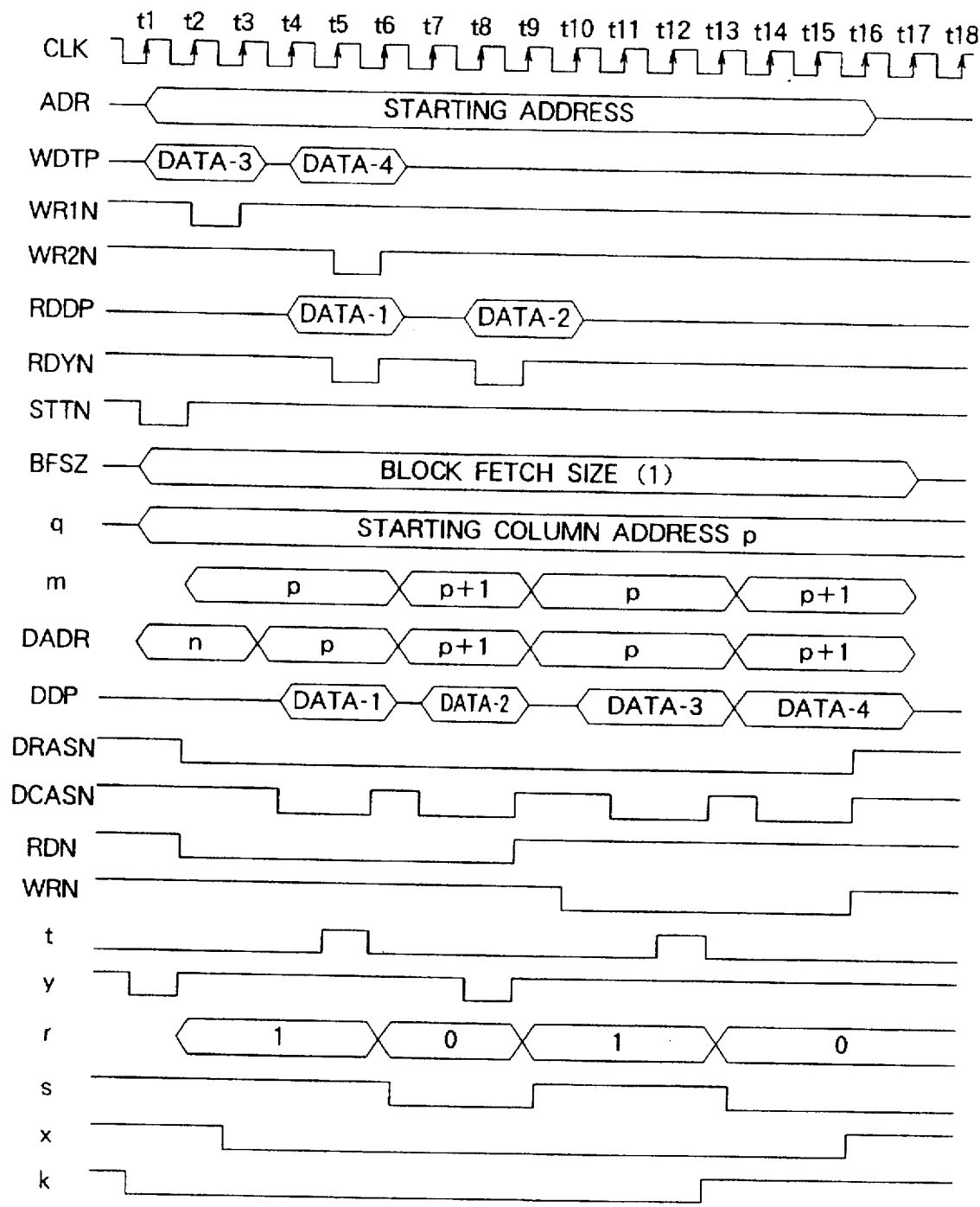
FIG. 7 is a timing diagram illustrating the operation of the second embodiment.

FIG. 7 is a timing diagram illustrating a read-and-replace operation performed by the second embodiment on a two-word block of data. The read portion of the operation is the same as in the first embodiment, so the following description will be confined to the replace or write portion, focusing on the differences from the first embodiment.

In advance of the read-and-replace operation, the higher-level controller 1 fetches from the system memory 30 two words of write data DATA-3 and DATA-4, which are to be written as a block into the memory device 3 to replace the data read from the memory device 3. The fetching of these two words DATA-3 and DATA-4 is not illustrated in FIG. 7.

At timing t1, the higher-level controller 1 outputs the first word of write data DATA-3 on the write data bus WTDP, and the timing generator 10 drives data selection signal k to the low level.

At timing t2, the higher-level controller 1 drives write signal WR1N low for one clock period. The first word of write data DATA-3 is latched in register 11 when write signal WR1N goes high at timing t3, after which output of DATA-3 ceases.

At timing t4, the higher-level controller 1 outputs the second word of write data DATA-4 on the write data bus WTDP. At timing t5, the higher-level controller 1 drives write signal WR2N low for one clock period. The second word of write data DATA-4 is latched in register 14 when write signal WR2N goes high at timing t6, after which output of DATA-4 ceases.

The higher-level controller 1 has considerable latitude in the timing of the above write operations. DATA-3 and DATA-4 can be written in registers 11 and 14 either earlier or later than the timings shown. It suffices for DATA-3 to be placed in register 11 by timing t10, and DATA-4 in register 14 by timing t13.

At timing t10, the timing generator 10 asserts write signal WRN. Since data selection signal k is low, the selector 15 selects register 11 and outputs DATA-3 to the output buffer 12. DATA-3 are written in the memory device 3 at column address p when the column address strobe DCASN goes low at timing t11.

At timing t13, the timing generator 10 switches data selection signal k from low to high, causing the selector 15 to select register 14 and output DATA-4. DATA-4 are written in the memory device 3 at column address p+1 when DCASN goes low at timing t14.

The testing of the result signal s and the control of signals t, x, and y are the same as in the first embodiment.

When the block size is greater than two words, the timing generator 10 switches the data selection signal k at every third clock period while writing to the memory device 3. In this way a block of arbitrary size can be filled with the two-word pattern consisting of DATA-3 and DATA-4.

The second embodiment can be varied by increasing the number of write data registers, providing a data selection signal k with more than two states (e.g. a multiple-bit data selection signal k), and switching the data selection signal k among these states so as to select the write data registers one after another. If there are N write data registers, the memory controller 2 can fill any block with an arbitrary N-word data pattern.

In particular, the memory controller 2 can replace the contents of an N-word data block with arbitrary new data. N can be any positive integer. The required number of clock periods is still 6N+4.

The second embodiment can be used, for example, to place a complex, multiple-word, background pattern in the image buffer of a printer, in preparation for printing the next page on that background pattern.

Figure 8:
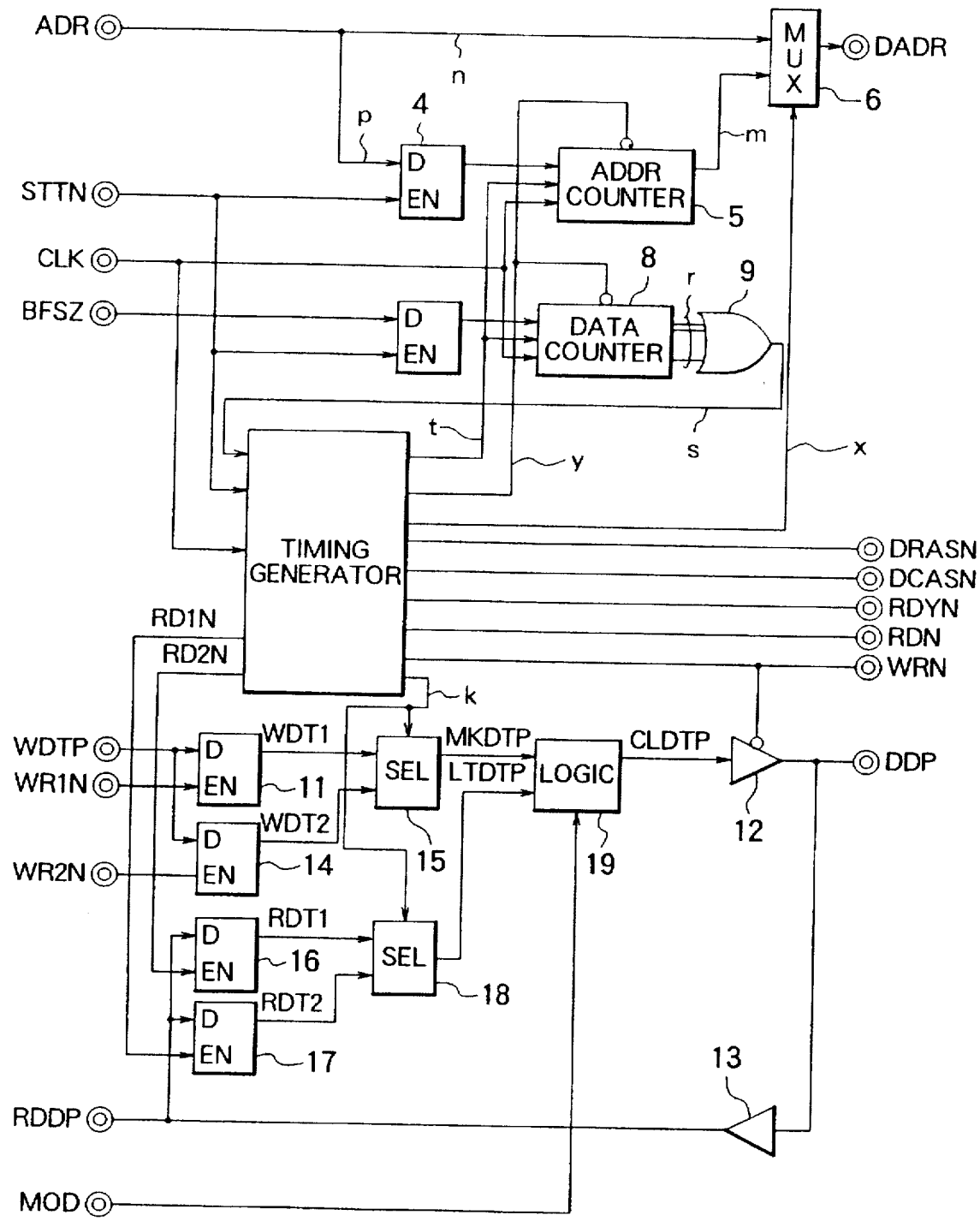
FIG. 8 is a block diagram illustrating a third embodiment of the invention.

FIG. 8 is a block diagram of the third embodiment. Elements identical to elements in the second embodiment are identified by the same reference numerals as in FIG. 6. The new elements are a pair of read data registers 16 and 17, a second selector 18, and a logic operation circuit 19.

The data inputs to the read data registers 16 and 17 are the read data signal RDDP from the input buffer 13. The enable inputs are two read timing signals RD1N and RD2N output by the timing generator 10. The outputs of registers 16 and 17 are denoted RDT1 and RDT2, respectively.

Selector 18 receives the same data selection signal k as selector 15, and operates similarly, selecting the data RDT1 latched in read data register 16 when k is low, and the data RDT2 latched in read data register 17 when k is high. The output of selector 18 is denoted LTDTP (latch data). The output of selector 15 is denoted MKDTP (mask data).

The logic operation circuit 19 receives a mode signal MOD from the higher-level controller 1, performs a logic operation designated by the mode signal MOD on the selected data outputs MKDTP and LTDTP, and outputs the result CLDTP (calculated data or modified data) to the output buffer 12.

RDT1, RDT2, LTDTP, MKDTP, and CLDTP are word signals, having the same bit width as the data buses DDP, RDDP, and WTDP. The mode signal MOD may have one or more bits, depending on the number of different logic operations performed by the logic operation circuit 19.

Descriptions of the other elements will be omitted, as they are the same as in the second embodiment.

Figure 9:
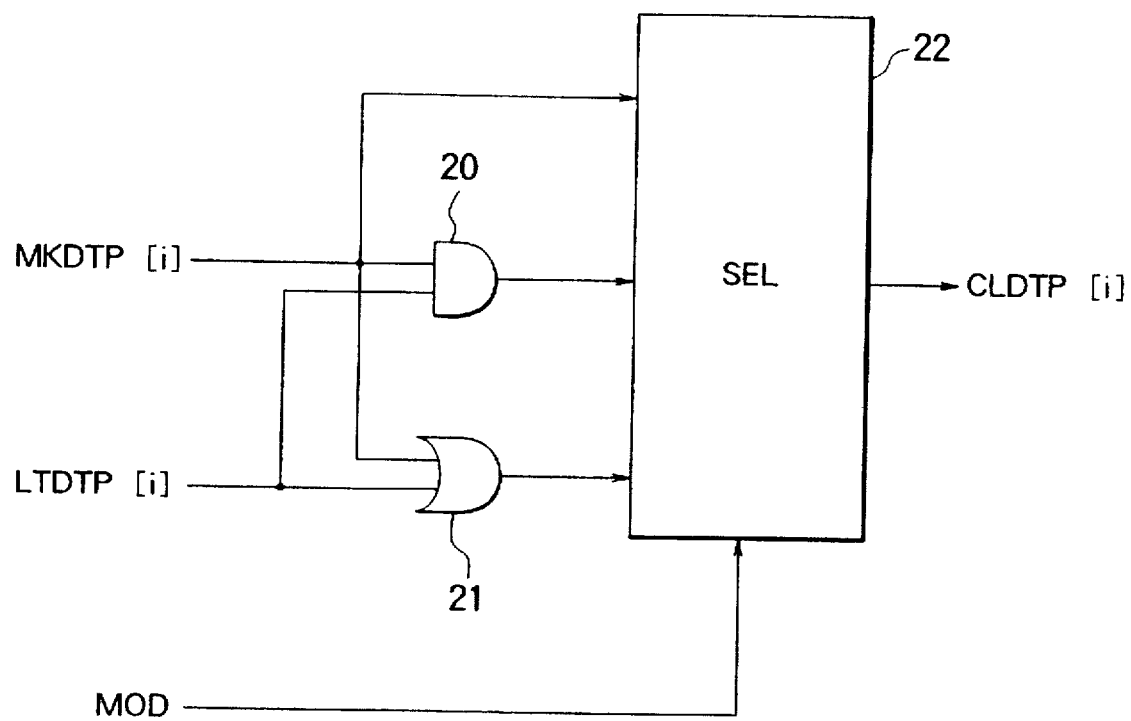
FIG. 9 is a more detailed block diagram of an example of the logic operation circuit in the third embodiment.

FIG. 9 shows an example of part of the structure of the logic operation circuit 19, comprising a two-input AND gate 20, a two-input OR gate 21, and a selector 22. The AND gate 20 receives one bit of MKDTP, denoted MKDTP[i], and one bit of LTDTP, denoted LTDTP[i]. The OR gate 21 receives these same two bits MKDTP[i] and LTDTP[i]. The selector 22 selects the output MKDTP[i] of selector 15, the output of the AND gate 20, or the output of the OR gate 21 according to the mode signal MOD, and outputs the selected signal as one bit CLDTP[i] of signal CLDTP.

The logic operation circuit 19 comprises one circuit of the type shown in FIG. 9 for each bit of CLDTP. The logic operation circuit 19 accordingly performs a straightforward replacement (CLDTP=MKDTP), a bitwise logical AND operation (CLDTP=MKDTP AND LTDTP), or a bitwise logical OR operation on (CLDTP=MKDTP OR LTDTP), depending on the state of the mode signal MOD. The AND logical operation is useful for clipping, filling, and various other purposes. The OR logical operation is useful for superimposing one image on another, and for other purposes.

The invention is not limited to the AND and OR logic operations shown in FIG. 9. Another operation that can be usefully provided in the logic operation circuit 19 is the bitwise exclusive OR logic operation. Arithmetic operations may also be carried out on MKDTP and LTDTP, as a special type of logic operation.

Figure 10:
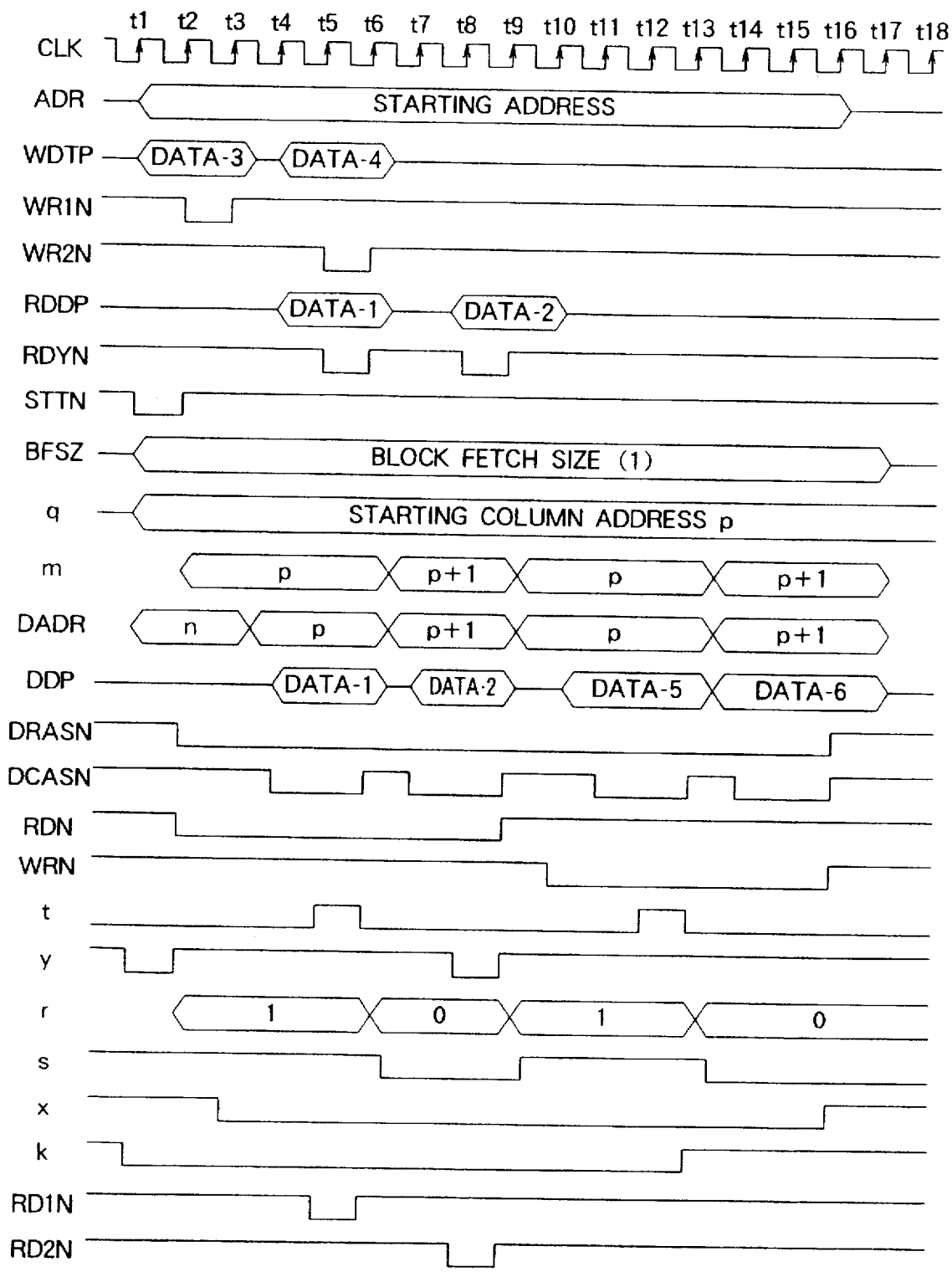
FIG. 10 is a timing diagram illustrating the operation of the third embodiment.

FIG. 10 is a timing diagram illustrating a read-modify-write operation performed on a two-word block by the third embodiment. The following description will be confined to the points that differ from the operation of the second embodiment illustrated in FIG. 7.

At timing t5, when the timing generator 10 asserts the RDYN signal to instruct the higher-level controller 1 to latch DATA-1, the timing generator 10 also asserts the RD1N signal. At timing t6, when the timing generator 10 deasserts RDYN, the timing generator 10 also de-asserts RD1N, leaving DATA-1 latched in the first read data register 16.

Similarly, when the timing generator 10 asserts and de-asserts the RDYN signal at timings t8 and t9, it also asserts and de-asserts the RD2N signal, causing DATA-2 to be latched in the second read data register 17.

From timing t5 until data selection signal k goes high at timing t13, selector 15 selects the output of the first write data register 11, which is DATA-3, and selector 18 selects the output of the first read data register 16, which is DATA-1. The logic operation circuit 19 performs the logic operation designated by the mode signal MOD (not visible) on DATA-1 and DATA-3 to produce modified DATA-5, which are output by the output buffer 12 to the memory device 3 on data bus DDP from approximately timing t10 to timing t13, while the write signal WRN and data selection signal k are both low. The memory device 3 latches DATA-5 at the high-to-low transition of DCASN at timing t11, and stores DATA-5 at column address p.

When data selection signal k goes high at timing t13, selector 15 begins output of DATA-4, which are held in the second write data register 14, and selector 18 begins output of DATA-2, which are held in the second read data register 17. The logic operation circuit 19 now performs the designated logic operation on DATA-2 and DATA-4 to produce modified DATA-6, which are output by the output buffer 12 on data bus DDP from approximately timing t13 to timing t16, while WRN is low and k is high. The memory device 3 latches DATA-6 at the high-to-low transition of DCASN at timing t14, and stores DATA-6 at column address p+1.

The operation shown in FIG. 10 can be extended to larger blocks as described in the second embodiment, either by toggling data selection signal k every three clock periods and thereby using DATA-3 and DATA-4 alternately to modify data throughout the block, or by providing more read data registers and write data registers and a multiple-bit data selection signal k, so that larger amounts of write data can be used to modify the read data. The number of clock periods required to read, modify, and write a block of N words of data is still only 6N+4.

Figure 11:
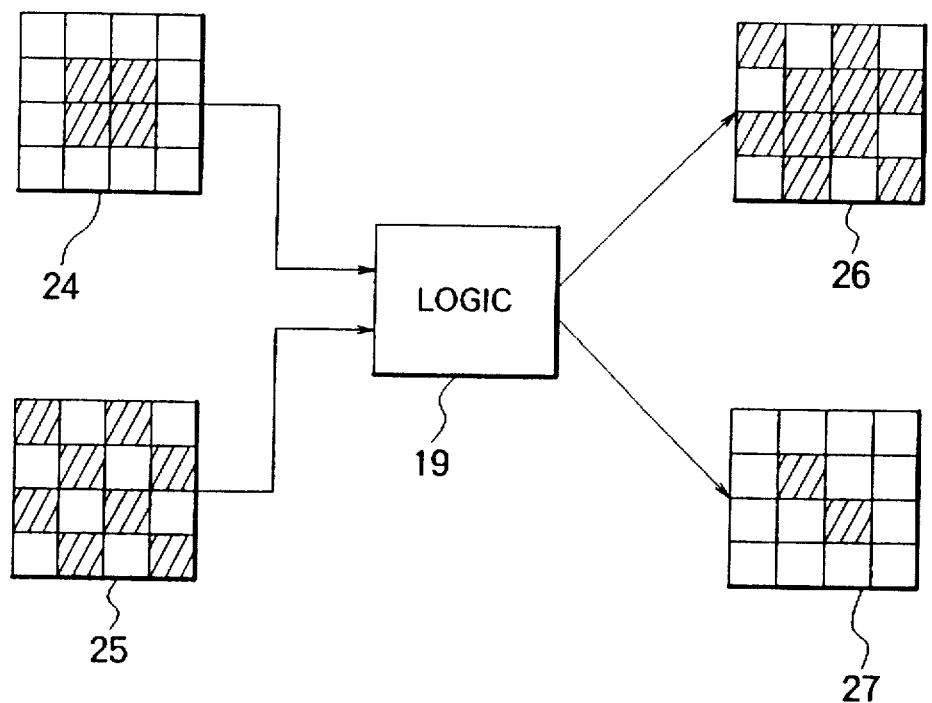
FIG. 11 illustrates operations performed by the logic operation circuit in the third embodiment.

FIG. 11 illustrates the AND and OR logical operations performed by the logic operation circuit 19 on two patterns 24 and 25. If pattern 24 represents the write data in write data registers 11 and 14 and pattern 25 represents the data read from the memory device 3 into the read data registers 16 and 17, then mode signal MOD can be set to select the OR logical operation to superimpose pattern 24 on the pre-existing background pattern 25, producing modified pattern 26. The mode signal MOD can also be set to select the AND logical operation and clip the pre-existing image pattern 25 according to the area defined by mask pattern 24, producing modified pattern 27. Conversely, if pattern 24 represents the read data and pattern 25 the write data, then AND logic can be selected to fill the pre-existing area defined by pattern 24 with the checkerboard pattern 25, again producing modified pattern 27.

In a page printer, read-modify-write operations with a limited repertory of modify logic are used over and over to carry out filling, clipping, superimposing, and other such tasks. Placing the necessary logic circuitry in the logic operation circuit 19 takes a major processing load off the higher-level controller 1, and enables these read-modify-write operations to be carried out at the same speed as the simpler read-and-clear or read-and-replace operations.

The invented memory controller preferably also has provisions for carrying out such conventional operations as read or write access to individual words, read access to a block of data without write access, or write access to a block of data without read access. These operations can be carried out using the circuits shown in the drawings, with additional control signals. Descriptions have been omitted to avoid obscuring the invention with unnecessary detail.

The invented memory controller can be used advantageously not only in page printers, but also in personal computers and other devices that display image data stored in an image buffer on a display screen, or in any type of device that often performs read-and-clear, or read-and-replace, or read-modify-write access to blocks of data.

The invention is not limited to the embodiments shown in the drawings. Some of the many possible variations are as follows.

The length of an individual read or write access does not have to be three clock periods. Longer or shorter access cycles are possible.

In the preceding descriptions all operations were synchronized with the low-to-high transitions of the clock signal, but of course the high-to-low clock transitions can be used instead. Moreover, the transitions of the memory control signals output from the memory controller do not have to be synchronized with clock transitions, provided the timing requirements of the memory device are met.

The described write operations employed what is termed an early write cycle, in which data are written in synchronization with the high-to-low transition of the column address strobe. Although output of a read control signal RDN was shown for clarity, this signal is not strictly necessary when early write cycles are employed. The output enable (OE) terminal of the memory device can be tied to the low level, so that output is enabled whenever WRN is inactive.

The address counter 5 need not be an up-counter. A down-counter can be employed instead.

The data counter 8 need not be a down-counter. An up-counter can be employed, together with a comparator to compare the count output r with the contents of the block fetch size register 7 and control the result signal s according to the comparison result.

When block access always begins and ends on certain address boundaries in the memory device, the data counter 8 can be eliminated and the result signal s obtained from the column address m output by counter 5, by taking the logical AND of a certain number of least-significant bits of the column address m, for example.

In the second and third embodiments, instead of having the higher-level controller 1 output separate write signals WR1N and WR2N for each write data register, the higher-level controller 1 can output a single write signal, the timing generator 10 can generate timing signals that select the data registers in sequence, and these timing signals can be combined with the write signal from the higher-level controller 1 to produce the signals input to the enable (EN) inputs of the data registers. Alternatively, the address signal ADR can be used to select the write data registers.

In the second and third embodiments, a further signal line can be provided by which the higher-level controller 1 notifies the memory controller 2 of the number of words of write data. The timing generator 10 can then be adapted to select the specified number of write data registers cyclically (in the second embodiment), or the specified number of read and write data registers cyclically (in the third embodiment), when the number of words of write data is less than the number of words in the data block. Read-and-replace operations and read-modify-write operations in which an arbitrary number of words of write data are used repetitively can then be carried out efficiently, the higher-level controller 1 having to supply the write data only once.

What is claimed is:

1. A memory controller coupled to a memory device by a bidirectional data bus, for receiving a starting address signal and a block fetch size signal, and reading and writing data in a block of consecutive addresses in said memory device via said data bus, comprising:

a starting address register for receiving and storing at least part of said starting address signal as a starting address;

a block fetch size register for receiving and storing said block fetch size signal as a block fetch size value;

at least one write data register for receiving and storing write data;

an address counter coupled to said starting address register, for loading said starting address as an address count in response to a first control signal, altering said address count in response to a second control signal, thereby producing a plurality of successive addresses, and sending said successive addresses to said memory device; and a control circuit coupled to said block fetch size register, said write data register, and said address counter, for sending said first control signal once and said second control signal at least once to said address counter and sending read control signals to said memory device, thereby causing said memory device to output data from said successive addresses, until said memory device has output data from a number of said successive addresses designated by said block fetch size value, then sending said first control signal once again and said second control signal at least once again to said address counter, sending write control signals to said memory device, and sending said write data from said write data register to said memory device, thereby causing said memory device to store said write data at said successive addresses, until said memory device has stored said write data at said number of said successive addresses designated by said block fetch size value, wherein said control circuit sends the write data stored in said write data register repeatedly to said memory device, causing said memory device to store the same write data repeatedly at said successive addresses.

2. A memory controller coupled to a memory device by a bi-directional data bus, for receiving a starting address signal and a block fetch size signal, and reading and writing data in a block of consecutive addresses in said memory device via said data bus, comprising:

a starting address register for receiving and storing at least part of said starting address signal as a starting address;

a block fetch size register for receiving and storing said block fetch size signal as a block fetch size value;

a plurality of write data registers for receiving and storing write data;

a first selector coupled to said write data registers, for selecting one of said write data registers responsive to a data selection signal, and outputting the write data in the selected one of said write data registers as first selected data;

an address counter coupled to said starting address register, for loading said starting address as an address count in response to a first control signal, altering said address count in response to a second control signal, thereby producing a plurality of successive addresses, and sending said successive addresses to said memory device; and a control circuit coupled to said block fetch size register, said first selector, and said address counter, for sending said first control signal once and said second control signal at least once to said address counter and sending read control signals to said memory device, thereby causing said memory device to output data from said successive addresses, until said memory device has output data from a number of said successive addresses designated by said block fetch size value, then sending said first control signal once again and said second control signal at least once again to said address counter, sending said data selection signal to said first selector, sending write control signals to said memory device, and sending said first selected data to said memory device, thereby causing said memory device to store said first selected data at said successive addresses, until said memory device has stored said first selected data at said number of said successive addresses designated by said block fetch size value.

3. A memory controller coupled to a memory device by a bidirectional data bus, for receiving a starting address signal and a block fetch size signal, and reading and writing data in a block of consecutive addresses in said memory device via said data bus, comprising:

a starting address register for receiving and storing at least part of said starting address signal as a starting address;

a block fetch size register for receiving and storing said block fetch size signal as a block fetch size value;

a plurality of write data registers for receiving and storing write data;

a first selector coupled to said write data registers, for selecting one of said write data registers responsive to a data selection signal, and outputting the write data in the selected one of said write data registers as first selected data;

an address counter coupled to said starting address register, for loading said starting address as an address count in response to a first control signal, altering said address count in response to a second control signal, thereby producing a plurality of successive addresses, and sending said successive addresses to said memory device;

a plurality of read data registers for storing the data output from said memory device;

a second selector for selecting one of said read data registers responsive to said data selection signal, and outputting the data in the selected one of said read data registers as second selected data;

a logic operation circuit for performing a logic operation on said first selected data and said second selected data, thereby producing modified data; and a control circuit coupled to said block fetch size register, said first selector, said second selector, and said address counter, for sending said first control signal once and said second control signal at least once to said address counter and sending read control signals to said memory device, thereby causing said memory device to output data from said successive addresses, until said memory device has output data from a number of said successive addresses designated by said block fetch size value, then sending said first control signal once again and said second control signal at least once again to said address counter, sending said data selection signal to said first selector and said second selector, sending write control signals to said memory device, and sending said modified data to said memory device, thereby causing said memory device to store said modified data at said successive addresses, until said memory device has stored said modified data at said number of said successive addresses designated by said block fetch size value.

4. The memory controller of claim 3, wherein said memory controller receives a mode signal, and said logic operation circuit comprises:

a plurality of logic circuits for performing different logic operations on said first selected data and said second selected data; and a third selector coupled to said logic circuits, for receiving said mode signal and selecting modified data output by one of said logic circuits responsive to said mode signal.

5. A method of controlling a memory device responsive to a starting address signal and a block fetch size signal, comprising, initializing an address count according to said starting address signal;

receiving write data;

storing said write data in at least one register;

altering said address count a number of times designated by said block fetch size signal;

each time said address count is altered, sending said address count to said memory device via a bidirectional data bus, together with a read signal, thereby causing said memory device to output data from successive addresses designated by said address count;

reinitializing said address count according to said starting address signal;

again altering said address count a number of times designated by said block fetch size signal; and each time said address count is again altered, sending said address count to said memory device via said bi-directional data bus, together with a write signal and said write data, thereby storing said write data at successive addresses, designated by said address count, in said memory device, wherein said write data comprise a unit of data which is sent to said memory device repeatedly, thereby causing said memory device to store said write data repeatedly at different addresses among said successive addresses.

6. A method of controlling a memory device responsive to a starting address signal and a block fetch size signal, comprising:

initializing an address count according to said starting address signal;

receiving write data;

storing said write data in at least one register;

altering said address count a number of times designated by said block fetch size signal;

each time said address count is altered, sending said address count to said memory device via a bidirectional data bus, together with a read signal, thereby causing said memory device to output data from successive addresses designated by said address count;

reinitializing said address count according to said starting address signal;

again altering said address count a number of times designated by said block fetch size signal; and each time said address count is again altered, sending said address count to said memory device via said bidirectional data bus, together with a write signal and said write data, thereby storing said write data at successive addresses, designated by said address count in said memory device, wherein said write data comprise different data to be stored at different addresses among said successive addresses.

7. A method of controlling a memory device responsive to a starting address signal and a block fetch size signal, comprising:

initializing an address count according to said starting address signal;

receiving write data;

storing said write data in at least one register;

altering said address count a number of times designated by said block fetch size signal;

each time said address count is altered, sending said address count to said memory device via a bi-directional data bus, together with a read signal, thereby causing said memory device to output data from successive addresses designated by said address count;

storing the data output by said memory device from said successive addresses when said read signal is sent;

reinitializing said address count according to said starting address signal;

again altering said address count a number of times designated by said block fetch size signal;

performing a logic operation on said write data and said data output by said memory device from said successive addresses, thereby producing modified data; and each time said address count is again altered, sending said address count to said memory device via said bi-directional data bus, together with a write signal and said modified data, thereby storing said modified data at successive addresses, designated by said address count, in said memory device.

8. The method of claim 7, comprising:

receiving a mode signal; and selecting said logic operation from a predetermined set of logic operations responsive to said mode signal.

9. The memory control circuit of claim 1, wherein the write data stored in said write data register comprise a plurality of bits all having identical values.

10. The memory control circuit of claim 1, wherein the write data stored in said write data register comprise a number of bits equal to a word width of said bi-directional data bus, and said write data register comprises an equal number of latches.

11. The memory control circuit of claim 1, wherein said write data register receives said write data on a write data bus, and said write data register comprises a number of latches equal to a word width of said write data bus.

* * * * *